(12) United States Patent  (10) Patent No.: US 8,386,632 B2
Wang et al.  (45) Date of Patent: Feb. 26, 2013

(54) METHOD, DEVICE, AND SYSTEM FOR CONTROLLING STREAMING MEDIA PLAY

(75) Inventors: Wenda Wang, Sydney (AU); Linfei Li, Shenzhen (CN); Yupeng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 13/114,511

(22) Filed: May 24, 2011

(65) Prior Publication Data

US 2011/0225316 A1    Sep. 15, 2011

Related U.S. Application Data

(63) Continuation of application No. PCT/CN2009/073529, filed on Aug. 26, 2009.

(30) Foreign Application Priority Data

Nov. 24, 2008  (CN) .......................... 2008 1 0219346

(51) Int. Cl.
*G06F 15/173* (2006.01)
(52) U.S. Cl. ...................................................... 709/231
(58) Field of Classification Search ........................ None
See application file for complete search history.

(56) References Cited

U.S. PATENT DOCUMENTS

| | | |
|---|---|---|
| 2002/0124099 A1 | 9/2002 | Srinivasan et al. |
| 2003/0236907 A1 | 12/2003 | Stewart et al. |
| 2005/0129049 A1 | 6/2005 | Srinivasan et al. |
| 2005/0141874 A1 | 6/2005 | Srinivasan et al. |
| 2005/0141886 A1 | 6/2005 | Srinivasan et al. |
| 2008/0109857 A1 | 5/2008 | Goodwill et al. |
| 2008/0273519 A1 | 11/2008 | Sedeffow |

FOREIGN PATENT DOCUMENTS

| | | |
|---|---|---|
| CN | 1801929 | 7/2006 |
| CN | 1997152 | 7/2007 |
| CN | 101094378 | 12/2007 |

(Continued)

OTHER PUBLICATIONS

Communication from the European Patent Office in related Application No. 09827140.6-1244 / 2341754; the extended European search report includes, pursuant to Rule 62 EPC, the supplementary European search report (Art. 153(7) EPC) and the European search opinion; mailed Feb. 13, 2012; Huawei Tech Co., Ltd.

International Search Report from P.R. China in International Application No. PCT/CN2009/073529, mailed Nov. 26, 2009.

(Continued)

*Primary Examiner* — Scott Christensen
(74) *Attorney, Agent, or Firm* — Conley Rose, P.C.; Grant Rodolph; Nicholas K. Beaulieu

(57) ABSTRACT

A method for controlling streaming media play includes: receiving from a terminal a PAUSE message requesting to pause the playing of a current streaming media file; pausing the sending of a media stream of the current streaming media file to the terminal and obtaining a first play time parameter, where the first play time parameter is about the time when the current streaming media file is paused; receiving from the terminal a PLAY message that carries a second play time parameter used to locate a play position of the streaming media file; and comparing the first play time parameter and the second play time parameter, and play, according to the comparison result, another streaming media file in the play list to which the current streaming media file belongs. This facilitates the selection of streaming media files by the user and enhances the user experience.

8 Claims, 3 Drawing Sheets

FOREIGN PATENT DOCUMENTS

| | | |
|---|---|---|
| CN | 101222625 | 7/2008 |
| CN | 101459976 | 6/2009 |
| EP | 1 239 673 A2 | 9/2002 |
| EP | 1 919 113 A2 | 5/2008 |
| WO | WO 2008/070832 A2 | 6/2008 |

OTHER PUBLICATIONS

Written Opinion of the International Search Authority related to International Application No. PCT/CN2009/073529, mailed Nov. 26, 2009,for Huawei Technologies Co., Ltd.

Second Office Action of Chinese Application 200810219346.5, mailed Jul. 12, 2010.

METHOD, DEVICE, AND SYSTEM FOR CONTROLLING STREAMING MEDIA PLAY

CROSS-REFERENCE TO RELATED APPLICATIONS

This application is continuation of International Application No. PCT/CN2009/073529, filed on Aug. 26, 2009, which claims priority to Chinese Patent Application No. 200810219346.5, filed on Nov. 24, 2008, both of which are hereby incorporated by reference in their entireties.

FIELD OF THE INVENTION

The present invention relates to the field of communication technologies, and in particular, to a method, device, and system for controlling streaming media play.

BACKGROUND OF THE INVENTION

With the development of wireless networks, streaming media services like video on demand and live, video based on streaming media systems are more and more popular. In a streaming media service process, a play list can be created to realize the continuous playing of multiple audio and video files. Creating a play list means adding audio/video files to be played to the list in sequence. A streaming media server will play the files in the play list according to the occurrence sequence of the files in the list. A terminal and the streaming media server interact with each other based on a procedure defined by a Real Time Streaming Protocol (RTSP). The steaming media server controls the play of the entire play list as if the play list is a single file.

A basic streaming media service procedure is: A system administrator publishes a streaming media file via a Content Management System (CMS), where the streaming media file is synchronized to the streaming media server; the streaming media server and the CMS interact to generate an RTSP Universal Resource Identifier (RTSP URI) for the terminal to initiate a video on-demand request; the CMS synchronizes the metadata (including URI, description, and price information) of the streaming media file to an Electronic Program Guide (EPG) server for presentation to the terminal. The terminal accesses the EPG to obtain the URI and initiates an access to the streaming media server via the URI.

During the implementation of the present invention, the inventor discovers that, in the prior art, the RTSP interaction procedure is designed for the control of individual streaming media files and as a result, during the playing of streaming media files, all files in a play list are regarded as one streaming media file. When a user wants to locate a certain file in the list, the user must drag the progress bar of the player or repeat forward and backward operations just like controlling a single file.

SUMMARY OF THE INVENTION

In view of the defect in the prior art, embodiments of the present invention provide a method, device, and system for controlling streaming media play to enable the playing of another streaming media file in the current play list when a streaming media file is played.

A method for controlling streaming media play includes:
receiving from a terminal a PAUSE message requesting to pause the playing of a current streaming media file;
pausing the sending of the current streaming media file to the terminal, and obtaining a first play time parameter, where the first play time parameter is about the time when the current streaming media file is paused;
receiving from the terminal a PLAY message, where the PLAY message carries a second play time parameter used to locate a play position of a streaming media file; and
comparing the first play time parameter and the second play time parameter, and playing, according to the comparison result, another streaming media file in the play list to which the current streaming media file belongs.

A device for controlling streaming media play includes:
a receiving module, configured to receive from a terminal a PAUSE message requesting to pause the playing of a current streaming media file and a PLAY message, where the PLAY message carries a second play time parameter used to locate a play position of a streaming media file;
a pause control module, configured to pause the sending of a media stream of the current streaming media file to the terminal, when the receiving module receives the PAUSE message;
a first obtaining module, configured to obtain, according to the PAUSE message received by the receiving module, a first play time parameter, where the first play time parameter is about the time when the current streaming media file is paused;
a second obtaining module, configured to obtain the second play time parameter from the PLAY message received by the receiving module;
a comparing module, configured to compare the first play time parameter obtained by the first obtaining module and the second play time parameter obtained by the second obtaining module and generate a comparison result; and
a play control module, configured to play, according to the comparison result of the comparing module, another streaming media file in the play list to which the current streaming media file belongs.

A system for controlling streaming media play includes:
a terminal, configured to: send to a streaming Media server a PAUSE message requesting to pause the playing of a current streaming media file and a PLAY message that carries a second play time parameter used to locate a play position of a streaming media file, receive a media stream sent by the streaming media server, and decode and play the media stream; and
the streaming media server, configured to: receive the PAUSE message and the PLAY message from the terminal, respectively obtain, according to the PAUSE message and the PLAY message, a first play time parameter which is about the time when the current streaming media file is paused and the second play time parameter used to locate the play position of the streaming media file, compare the first play time, parameter and the second play time parameter, and play, according to the comparison result, another streaming media file in the play list to which the current streaming media file belongs.

In the embodiments of the present invention, when receiving from the terminal a PAUSE message requesting to pause the playing of the current streaming media file, the streaming media server obtains a first play time parameter, where the first play time parameter is about the time when the current streaming media file is paused, receives a PLAY message sent by the terminal, and obtains, from the PLAY message, the second play time parameter used to locate a play position of a streaming media file, then compares the first play time parameter and the second play time parameter, and plays, according to the comparison result, another streaming media file in the current play list to which the current streaming media file belongs. In this way, the present invention realizes the playing of another streaming media file in the play list to which the current streaming media file belongs, when the current streaming media file is played. This facilitates the selection of streaming media files by the user and thus enhances the user experience.

BRIEF DESCRIPTION OF THE DRAWINGS

To better explain the technical solution of the present invention, the accompanying drawings required in the description of the embodiments of the present invention will be briefly described. It is apparent, that the accompanying drawings illustrate only some exemplary embodiments of the present invention. Those skilled in the art can derive other drawings from these drawings without any creative effort.

DETAILED DESCRIPTION OF THE EMBODIMENTS

To better explain the technical solution of the present invention, the embodiments of the present invention will be described in detail with reference to the accompanying drawings. It is apparent that the embodiments herein are only some exemplary embodiments of the present invention. Based on the embodiments herein, those skilled in the art can derive other embodiments without any creative effort and such other embodiments all fall within the protection scope of the present invention.

Figure 1:
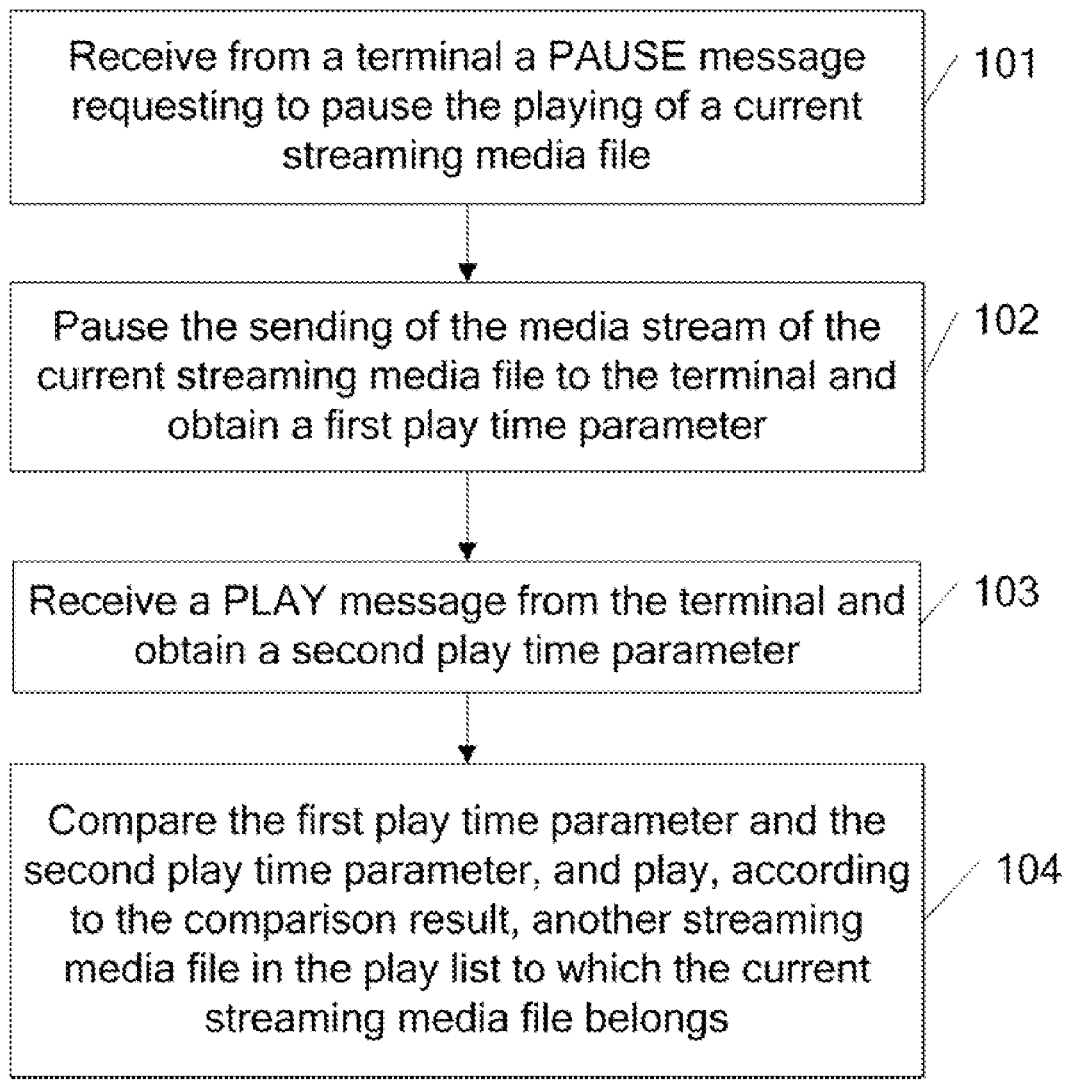
FIG. 1 is a flowchart of a method for controlling streaming media play according to an embodiment of the present invention.

FIG. 1 is a flowchart of a method for controlling streaming media play according to an embodiment of the present invention. The method includes the following steps:

101. Receive from a terminal a PAUSE message requesting to pause the playing of the current streaming media file.

Specifically, the PAUSE message may be an RTSP PAUSE message. During the interaction between the terminal and the streaming media server to play the streaming media file, if the user wants to skip the streaming media file that is currently being played to view the next streaming media file in the current play list, the user can send an RTSP PAUSE message to the streaming media server through the terminal, requesting the streaming media server to pause the playing of the current streaming media file.

102. Pause the sending of the media stream of the current streaming media file to the terminal, and obtain a first play time parameter, where the first play time parameter is about the time when the current streaming media file is paused.

Specifically, the media stream is a Real-time Transport Protocol (RTP) media stream. After the streaming media server receives the RTSP PAUSE message from the terminal, the streaming media server pauses the sending of the RTP media stream of the current streaming media file to the terminal, and obtains the first play time parameter which is about the time when the current streaming media file is paused. In practice, the streaming media server may obtain directly from the RTSP PAUSE message the first play time parameter NPT1, which is about the time when the current streaming media file is paused, or obtain, according to the play information of the streaming media file, the NPT1 of the current streaming media file, where NPT1 is about the time when the RTSP PAUSE message is received. For example, the start play point of the current streaming media file is the $0^{th}$ second, and when the RTSP PAUSE message is received, the streaming media file has been normally played for 100 seconds, and in this case, the NPT1 value can be recorded as 100.

103. Receive a PLAY message sent by the terminal, and obtain a second play time parameter, where the PLAY message carries the second play time parameter used to locate the play position of the streaming media file.

Specifically, the PLAY message may be an RTSP PLAY message. After the terminal receives the response of the streaming media server to the RTSP PAUSE message, the terminal sends an RTSP PLAY message to the streaming media server, where the RTSP PLAY message carries the second play time parameter NPT2 used to locate the play position of the streaming media file.

104. Compare the first play time parameter and the second play time parameter, and play, according to the comparison result, another streaming media file in the play list to which the current streaming media file belongs.

Here, the step of playing, according to the comparison result, another streaming media file in the play list to which the current streaming media file belongs includes: if the comparison result is that the parameter NPT2 is larger than the NPT1, sending the media stream from the start position of the streaming media file next to the current streaming media file in the play list to the terminal; if the comparison result is that the parameter NPT2 is smaller than the NPT1, sending the media stream from the start position of the streaming media file preceding the current streaming media file in the play list to the terminal. The following describes an example to explain the above play control method.

Assume that the play list includes the streaming media files A, B, and C in sequence; the normal play start time of file A is the $0^{th}$ second; the normal play start time of file B is the $300^{th}$ second; and the normal play start time of file C is the $600^{th}$ second. Assume that the first play time parameter NPT1, which is obtained in step 102 and is about the time when the current streaming media file is paused, is 320, and that the NPT2, obtained in step 103 and used to locate the play position, is 400. The NPT1 and NPT2 are compared, and it is judged that the NPT2 is larger than the NPT1. The RTP media stream from the start position of the streaming media file next to the current streaming media file in the current play list is sent to the terminal. That is, the streaming media server sends, to the terminal, the RTP media stream of file C from the start position of file C, the $600^{th}$ second. Likewise, if the NPT2 is, smaller than the NPT1, the streaming media server sends the RTP media stream from the start position of the streaming media file preceding the current streaming media file in the current play list to the terminal, that is, sending, to the terminal, the RTP media stream of file A from the start position of file A, the $0^{th}$ second.

Figure 1A:
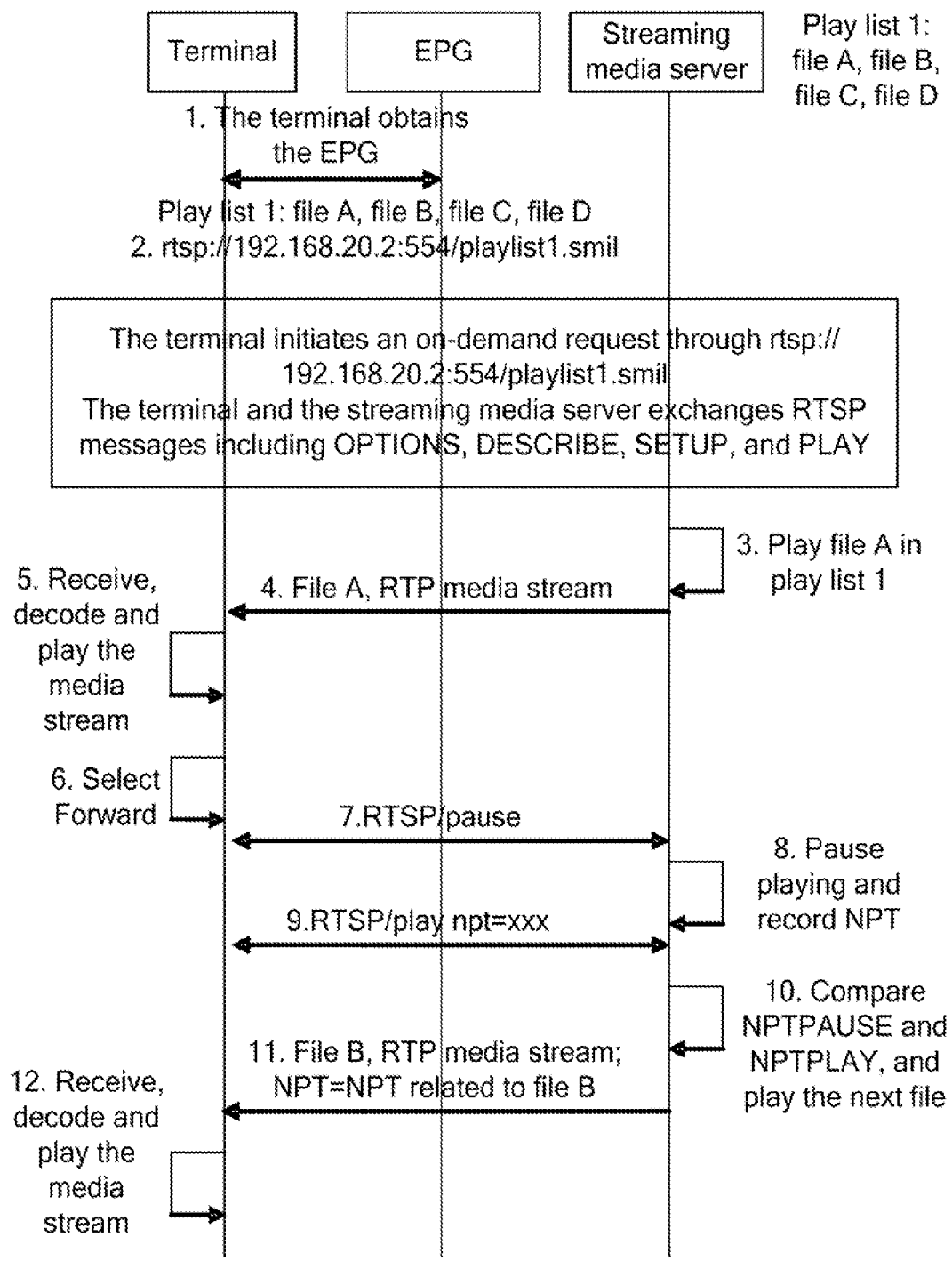
FIG. 1A is a flowchart of a method for controlling streaming media play according to an embodiment of the present invention.

FIG. 1A is a flowchart of a method for controlling streaming media play according to an embodiment of the present invention. The method includes the following steps:

S1. A terminal obtains play list information by accessing an EPG server of a streaming media service platform. The play list information here may include the description of a play list and a URI for initiating an on-demand service.

The play list 1 shown in FIG. 1A is a specific example of the play list. The play list 1 includes file A, file B, file C, and file D. The rtsp://192.168.20.2:554/playlist1.smil shown in FIG. 1A is a specific example of the URI for initiating an on-demand service.

S2. The terminal sends an on-demand request to the streaming media server through the URI for initiating an on-demand service, where the URI is in the play list information. The terminal will exchange RTSP OPTIONS, DESCRIBE, SETUP, and PLAY messages with the streaming media server.

Specifically, the terminal sends an OPTIONS request message to the streaming media server, and the streaming media server notifies the terminal, through an OPTIONS response message, the RTSP commands supported by the streaming media server. The terminal sends a DESCRIBE request message to the streaming media server, where the DESCRIBE request message is a request for the related description parameter of a specified media file in the URL. The terminal initializes a media decoder by using the description parameter. The terminal sends a SETUP request message to the streaming media server. The SETUP request message carries the transport protocol such as the Transport Control Protocol (TCP) or User Datagram Protocol (UDP) that the client wishes to use in data transmission. The streaming media server sends a SETUP response message to the terminal. The SETUP response message carries the transport parameters specified by the streaming media server, where the transport parameters include the transport protocol type. The terminal sends a PLAY request message to the streaming media server, notifying the streaming media server that media data can be transmitted by using the transport mechanism specified in the SETUP request message. A range parameter carried in the PLAY request message indicates a play range of the media data. After receiving the PLAY request message, the streaming media server sends media data to the terminal according to the media data start play point and end play point specified by the range parameter.

S3. The streaming media server processes the PLAY request message of the terminal and plays the file A in the play list 1.

S4. The streaming media server sends the RIP media stream of the file A in the play list 1 to the terminal.

S5. The terminal receives the RTP media stream, decodes and plays the received RTP media stream.

If the user wants to skip the currently played file A and view the file B, the user selects the Forward button on the terminal. Then the procedure goes to step S6, and the terminal receives the command related to the Forward button.

S7. The terminal sends an RTSP PAUSE request message to the streaming media server. The streaming media server returns to the terminal a response to the PAUSE request message.

S8. The streaming media server pauses the sending of the RTP media stream of the file A to the terminal and records the NPT value carried in the message. If the message does not carries an NPT value, the streaming media server calculates, according to the play information, the NPT value when the PAUSE message is received, and records the calculated NPT value. The NPT value recorded by the streaming media server may be referred to as NPTPAUSE, that is, the first play time parameter.

S9. After receiving from the streaming media server a response to the PAUSE message, the terminal sends an RTSP PLAY request, message to the streaming media server. The PLAY request carries an NPT value. The NPT value carried in the PLAY request message may be the NPT value in the PLAY request message related to the Forward function.

S10. The streaming media sever obtains the NPT value from the PLAY request message. The NPT may be referred to as NPTPLAY, that is, the second play time parameter. The value of NPTPLAY is represented as xxx. The streaming media server compares NPTPLAY with NPTPAUSE. Because NPTPLAY is larger than NPTPAUSE, the streaming media server starts playing from the start position of file B.

S11. The streaming media server sends the RTP media stream of file B to the terminal, where the value of NPT is the NPT corresponding to file B, which may be xxx, or may not be xxx.

S12. The terminal receives the RTP media stream, decodes and plays the received RTP media stream. The played image changes from file A to the start image of file B. The interaction process for selection of the next file ends.

Figure 2:
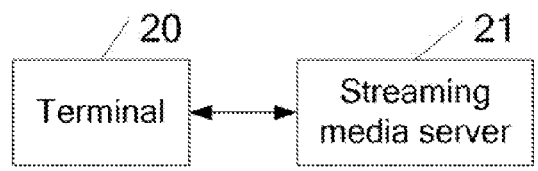
FIG. 2 is a schematic diagram of a structure of a system for controlling streaming media play according to an embodiment of the present invention.

FIG. 2 is a schematic diagram of a structure of a system for controlling streaming media play according to an embodiment of the present invention. The system includes a terminal 20 and a streaming media server 21. The terminal 20 is configured to: send to the streaming media server 21 a PAUSE message requesting to pause the playing of the current streaming media file and a PLAY message requesting to locate a play position of the streaming media file, receive the media stream sent by the streaming media server 21, and decode and play the media stream.

The streaming media server 21 is configured to: receive the PAUSE message and PLAY message from the terminal 20, respectively obtain, according to the PAUSE message and the PLAY message, the first play time parameter which is about the time when the current streaming media file is paused and the second play time parameter used to locate the play position of the streaming media file, compare the first play time parameter and the second play time parameter, and play, according to the comparison result, another streaming media file in the play list to which the current streaming media file belongs.

Specifically, the streaming media server 21 receives from the terminal 20 the PAUSE message requesting the streaming media server to pause the playing of the current streaming media file. After receiving the PAUSE message, the streaming media server 21 pauses the sending of the media stream of the current streaming media file to the terminal 20 and obtains the first play time parameter, where the first play time parameter is about the time when the current streaming media file is paused. For example, the start play time of the current streaming media file is the $0^{th}$ second, and when the streaming media server 21 receives the RTSP PAUSE message, the streaming Media file has been played normally for 100 seconds; then the first play time parameter is recorded as 100. The streaming media server 21 receives the PLAY message sent by the terminal 20. The PLAY message carries the second play time parameter used to locate the play position of the streaming media file. The streaming media server 21 obtains the second play time parameter and compares the first play time parameter and the second play time parameter. If the comparison result is that the second play time parameter is larger than the first play time parameter, the streaming media server 21 sends the media stream to the terminal 20 from the start position of the streaming media file next to the current streaming media file in the current play list. If the comparison result is that the second play time parameter is smaller than the first play time parameter, the streaming media server 21 sends the media stream to the terminal 20 from the start position of the streaming media file preceding the current streaming media file in the current play list.

Figure 3:
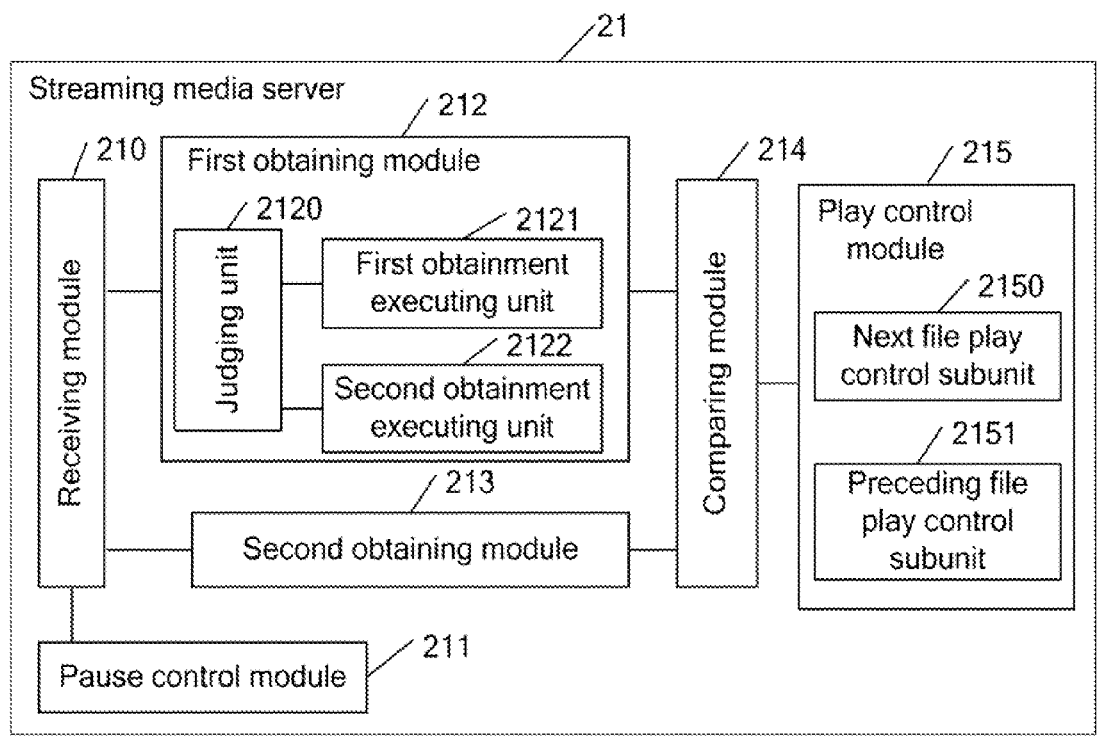
FIG. 3 is a schematic diagram of a structure of a streaming media server according to an embodiment of the present invention.

The streaming media server 21 will be described with reference to FIG. 3. FIG. 3 is a schematic diagram of a structure of the streaming media server according to an embodiment of the present invention. The streaming media server 21 includes a receiving module 210, a pause control module 211, a first obtaining module 212, a second obtaining module 213, a comparing module 214, and a play control module 215. The functions of the modules and the relations between them will be described in detail.

The receiving module 210 is configured to receive from the terminal the PAUSE message requesting to pause the playing of the current streaming media file and the PLAY message. The PLAY message carries the second play time parameter used to locate a play position of the streaming media file. The PAUSE message may be an RTSP PAUSE message and the PLAY message may be an RTSP PLAY message.

The pause control module 211 is configured to pause the sending of the media stream of the current streaming media file to the terminal when the receiving module 210 receives the PAUSE message, where the media stream is an RTP media stream.

The first obtaining module 212 is configured to obtain, according to the PAUSE message received by the receiving module 210, the first play time parameter which is about the time when the current streaming media file is paused. Specifically, the first obtaining module 212 includes: a judging unit 2120, configured to judge whether the PAUSE message received by the receiving module 210 carries the first play time parameter which is about the time when the current streaming media file is paused; a first obtainment executing unit 2121, configured to obtain the first play time parameter from the PAUSE message received by the receiving module 210 when the judging unit 2120 judges that the message carries the first play time parameter; and a second obtainment executing unit 2122, configured to, when the judging unit 2120 judges that the PAUSE does not carry the first play time parameter, obtain, according to the PLAY message, the first play time parameter of the current streaming media file when the receiving module 210 receives the PAUSE message.

The second obtaining module 213 is configured to obtain the second play time parameter from the PLAY message received by the receiving module 210.

The comparing module 214 is configured to compare the first play time parameter obtained by the first obtaining module 212 and the second play time parameter obtained by the second obtaining module 213, and generate a comparison result.

The play control module 215 is configured to play, according to the comparison result of the comparing module 214, another streaming media file in the play list to which the current streaming media file belongs. Specifically, the play control module 215 mainly includes: a next file play control subunit 2150, configured to send the media stream to the terminal from the start position of the streaming media file next to the current streaming media file in the current play list when the comparison result of the comparing module 214 is that the second play time parameter is larger than the first play time parameter; and a preceding file play control unit 2151, configured to send the media stream to the terminal from the start position of the streaming media file preceding the current streaming media file in the current play list when the comparison result of the comparing module 214 is that the second play time parameter is smaller than the first play time parameter.

With the method, device, and system for controlling streaming media play according to embodiments of the present invention, when a PAUSE message requesting to pause the playing of the current streaming media file is received from the terminal, the first play time parameter, which is about the time when the current streaming media file is paused, is obtain, the PLAY message sent by the terminal is obtained, and the second play time parameter used to locate a play position of the streaming media file is obtained from the PLAY message, then the first play time parameter and the second play time parameter are compared, and according to the comparison result, another streaming media file in the play list to which the current streaming media file belongs is played. In this way, the present invention realizes the playing of another streaming media file in the play list to which the current streaming media file belongs, when the current streaming media file is played. This facilitates the selection of streaming media files by the user and thus enhances the user experience.

Those skilled in the art understand that all or part of steps in the method provided according to the preceding embodiments of the present invention can be implemented by hardware under the instruction of a program. The program may be stored in a computer readable storage medium and when the program is executed, the steps in the method provided in the embodiments are executed. The storage medium may be a magnetic disk, a Compact Disk-Read Only Memory (CD-ROM), a Read Only Memory (ROM), or a Random Access Memory (RAM).

Although the present invention has been described in detail through some exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the claims or their equivalents.

What is claimed is:

1. A method for controlling streaming media play comprising:
    receiving from a terminal a PAUSE message requesting to pause the playing of a current streaming media file;
    pausing the sending of the current streaming media file to the terminal; and
    obtaining a first play time parameter which indicates the time when the current streaming media file is paused;
    receiving a PLAY message sent by the terminal, wherein the PLAY message carries a second play time parameter used to locate a play position of the streaming media file;
    comparing the first play time parameter and the second play time parameter;
    when the comparison result is that the second play time parameter is larger than the first play time parameter, sending a media stream to the terminal from a start position of a streaming media file next to the current streaming media file in the current play list; and
    when the comparison result is that the second play time parameter is smaller than the first play time parameter, sending a media stream to the terminal from a start position of a streaming media file preceding the current streaming media file in the current play list.

2. The method according to claim 1, wherein the PAUSE message carries the first play time parameter, and wherein the step of obtaining the first play time parameter which indicates the time when the current streaming media file is paused comprises obtaining, from the PAUSE message, the first play time parameter of the current streaming media file when the PAUSE message is received.

3. The method according to claim 1, wherein the step of obtaining the first play time parameter which indicates the time when the current streaming media file is paused comprises obtaining, according to the PLAY message, the first play time parameter of the current streaming media file when the PAUSE message is received.

4. The method according to claim 1, wherein the PAUSE message is a Real Time Streaming Protocol (RTSP) PAUSE message, wherein the PLAY message is an RTSP PLAY message, and wherein the media stream is a Real-time Transport Protocol (RTP) media stream.

5. A computer program product, comprising one of more non-transitory computer readable storage media that store one or more computer executable instructions thereon that when executed by a processor cause the computer program product to:
- receive from a terminal a PAUSE message requesting to pause the playing of a current streaming media file;
- pause the sending of a media stream of the current streaming media file to the terminal;
- obtain a first play time parameter which indicates the time when the current streaming media file is paused;
- receive a PLAY message sent by the terminal, wherein the PLAY message carries a second play time parameter used to locate a play position of the streaming media file;
- compare the first play time parameter and the second play time parameter to generate a comparison result;
- send the media stream to the terminal from a start position of a streaming media file next to the current streaming media file in the current play list when the comparison result is that the second play time parameter is larger than the first play time parameter; and
- send the media stream to the terminal from a start position of a streaming media file preceding the current streaming media file in the current play list when the comparison result is that the second play time parameter is smaller than the first play time parameter.

6. The computer program product according to claim 5, wherein obtaining a first play time parameter which indicates the time when the current streaming media file is paused comprises;
- judging whether the PAUSE message carries the first play time parameter which indicates the time when the current streaming media file is paused;
- obtaining the first play time parameter from the PAUSE message when the PAUSE message carries the first play time parameter which indicates the time when the current streaming media file is paused; and
- when the PAUSE message does not carry the first play time parameter which indicates the time when the current streaming media file is paused, obtaining, according to the PLAY message, the first play time parameter of the current streaming media file when the PAUSE message is received.

7. The computer program product according to claim 5, wherein the PAUSE message is a Real Time Streaming Protocol (RTSP) PAUSE message, wherein the PLAY message is an RTSP PLAY message, and wherein the media stream is a Real-time Transport Protocol (RTP) media stream.

8. A system for controlling streaming media play comprising:
- a terminal having a first processor configured to send to a streaming media server a PAUSE message requesting to pause the playing of a current streaming media file and a PLAY message that carries a second play time parameter used to locate a play position of the streaming media file, receive a media stream sent by the streaming media server, and decode and play the media stream; and
- the streaming media server having a second processor configured to receive the PAUSE message and the PLAY message from the terminal, respectively obtain, according to the PAUSE message and the PLAY message, a first play time parameter which indicates the time when the current streaming media file is paused and the second play time parameter used to locate the play position of the streaming media file, compare the first play time parameter and the second play time parameter, send a media stream to the terminal from a start position of a streaming media file next to the current streaming media file in the current play list when the comparison result is that the second play time parameter is larger than the first play time parameter or send a media stream to the terminal from a start position of a streaming media file preceding the current streaming media file in the current play list when the comparison result is that the second play time parameter is smaller than the first play time parameter.

\* \* \* \* \*